No. 799,261. PATENTED SEPT. 12, 1905.
G. PRATTS.
CONFECTIONERY MIXING MACHINE.
APPLICATION FILED MAY 8, 1905.

2 SHEETS—SHEET 1.

Witnesses
Howard W. Orr.
B. G. Foster

Inventor,
Gust Pratts,
By E. G. Siggers
Attorney

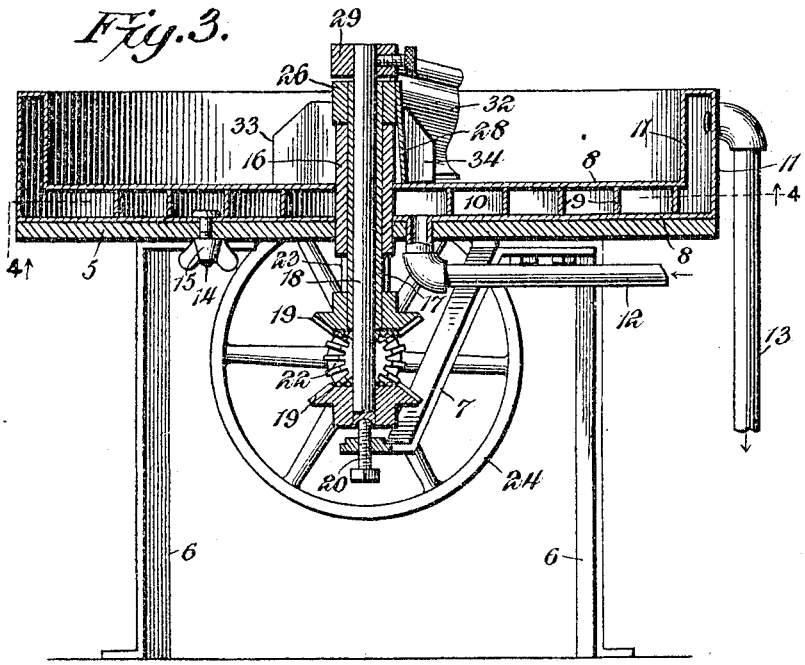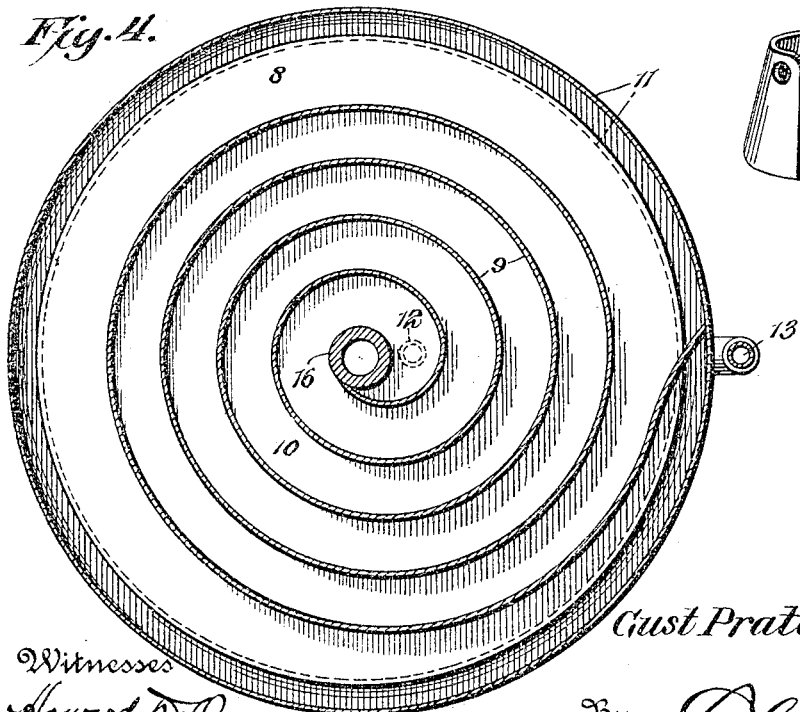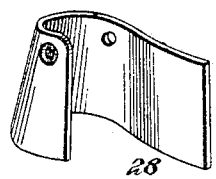

UNITED STATES PATENT OFFICE.

GUST PRATTS, OF FLINT, MICHIGAN.

CONFECTIONERY-MIXING MACHINE.

No. 799,261.  Specification of Letters Patent.  Patented Sept. 12, 1905.

Application filed May 8, 1905. Serial No. 259,336.

*To all whom it may concern:*

Be it known that I, GUST PRATTS, a citizen of the United States, residing at Flint, in the county of Genesee and State of Michigan, have invented a new and useful Confectionery-Mixing Machine, of which the following is a specification.

This invention relates to mechanism particularly useful for stirring or mixing candy in the manufacture of the same, but is not necessarily limited to this use.

One of the principal objects is to provide in connection with a receptacle for the material simple and novel means for thoroughly mixing, stirring, or commingling the material placed therein, said mechanism being arranged to act throughout the receptacle, and consequently upon all the material placed therein.

A further object is to provide means for thoroughly and evenly cooling the receptacle and its contents while the latter is being stirred or mixed.

The preferred embodiment of the invention is illustrated in the accompanying drawings, wherein—

Figure 1:
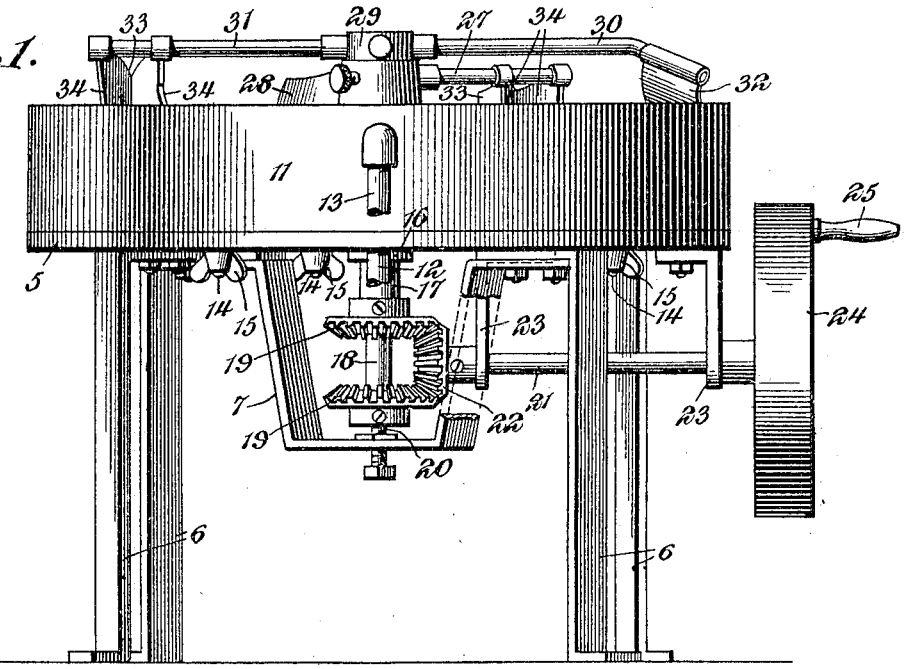
Figure 2:
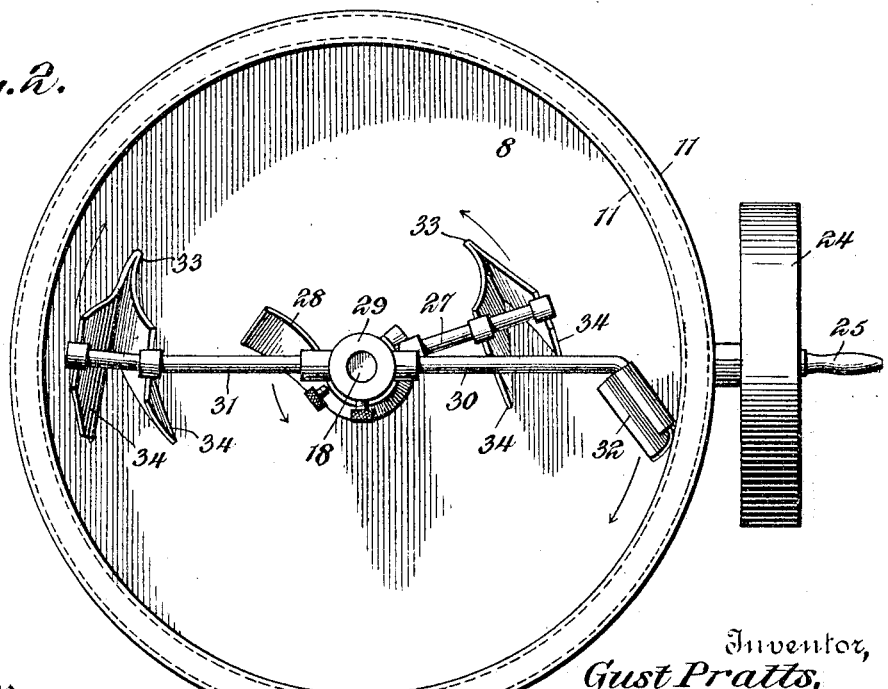

Figure 1 is a view in elevation of the machine. Fig. 2 is a top plan view of the same. Fig. 3 is a vertical sectional view. Fig. 4 is a horizontal sectional view on the line 4 4 of Fig. 3. Fig. 5 is a detail perspective view of the inner stirrer-blade.

Similar reference-numerals designate corresponding parts in all the figures of the drawings.

In the embodiment illustrated a supporting-base is employed, comprising a platform 5, mounted on legs 6 and carrying a depending yoke-bracket 7. Supported on the base is a receptacle circular in form and comprising a bottom and upstanding annular sides. The bottom is flat and consists of spaced walls 8, connected by a convolute partition 9, thus forming a similar channel 10 in said bottom. The sides also consist of spaced walls 11, forming between them a space which is in communication with the outermost whirl of the channel. A cooling medium is introduced into the central portion of the channel by means of a pipe 12, connected thereto, while the outlet from said channel is through a pipe 13, communicating with the space between the side walls. The receptacle is held in position on the base by any suitable means—as, for instance, depending-bolts 14, which pass through the platform 5 and have thumb-nuts 15 threaded thereupon.

The receptacle has a centrally-disposed sleeve 16 extending through the bottom and projecting above and below the same. In this sleeve are journaled concentric shafts 17 and 18, the shaft 18 extending below the shaft 17 and both having secured to their lower ends oppositely-disposed bevel gear-wheels 19. The shaft 18 has a thrust-bearing in the form of a screw 20, threaded through the lower portion of the yoke-bracket 7 and bearing against the lower end of said shaft. The shafts are driven from a counter-shaft 21, having a bevel-gear 22 interposed between and meshing with the gears 19. The shaft 21 is journaled in suitable brackets 23, secured to the under side of the platform 5, and has at its outer end a suitable driving-pulley or fly-wheel 24, which may be provided with an operating-handle 25.

The shaft 17 extends above the sleeve 16, and secured upon its projecting end is a bushing 26, carrying a cross-arm 27. There is also secured to this bushing a rearwardly and outwardly inclined stirrer-blade 28, that operates in the central portion of the receptacle directly over the bottom thereof and about the journal-sleeve 16. The shaft 18 extends above the shaft 17 and has secured to its upper end a collar 29, provided with cross-arms 30 and 31, the arm 30 being longer than the arm 31. Secured to said arm 30 is a rearwardly and inwardly inclined stirrer-blade 32, that operates in the outer portion of the receptacle directly adjacent to the sides thereof. The arms 27 and 31 are of different lengths, and secured to their outer ends are plows 33, having oppositely-extending rearwardly-inclined wings 34.

In using the machine the material to be mixed is placed in the receptacle and a cooling medium, such as water, is passed through the indirect or convolute channel, the current of moving water thus coming in contact with practically all portions of the walls. The driving-shaft 21 being rotated, the shafts 17 and 18 will be revolved in opposite directions, and therefore the stirrer-blades 28 and 32 will also be moved in opposite directions. The inner blade 28 will consequently move the material in the central portion of the receptacle outwardly, while the outer blade 32 will force the material in its path of movement inwardly. The plows 33 have concentric paths of movement in opposite directions between said stirrer-blades, and dividing the material in their respective paths will force the same outwardly and inwardly because of the oppositely-inclined wings. It will be apparent that by this combination of blades and plows practically the entire surface of the bottom is operated over and the material is passed from one stirring device to another, so that it is thoroughly mixed and commingled. At the same time the material is subjected to the cooling action of the flowing medium in the channel and is thus rapidly and effectively cooled.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a mixing-machine, the combination with a receptacle, of an inwardly-inclined stirrer-blade operating in the outer portion of the receptacle, an outwardly-inclined stirrer-blade operating about the central portion of the receptacle, oppositely-moving plows operating in paths of movement between the outer and inner blades, and means for operating the said blades and plows.

2. In a mixing-machine, the combination with a circular receptacle having a bottom, of stirrer-blades in the receptacle rotating about a common center and respectively operating over the outer and central portions of the bottom in spaced paths of movement, a plow having a rotary movement between the paths of movement of the blades and having oppositely-extending wings that move the material in opposite directions, and means for rotating the blades and plow.

3. In a mixing-machine, the combination with a circular receptacle having a substantially flat bottom, of upright shafts arranged centrally of the receptacle, cross-arms carried by the shafts and operating in different horizontal planes, an inwardly and rearwardly inclined stirrer-blade carried by one of the cross-arms and operating over the bottom contiguous to the side walls of the receptacle, an outwardly-extending stirrer-blade carried by one of the shafts and rotating about the central portion of the receptacle, and oppositely-rotating plows carried by the other cross-arms and rotating in paths of movement between the paths of movement of the blades, said plows having oppositely-extending wings that move the material both outwardly and inwardly.

4. In a mixing-machine, the combination with a receptacle having a bottom comprising spaced continuous walls and a convolute partition connecting the spaced walls and forming a correspondingly-shaped passage for the passage of a cooling medium, of means for introducing a cooling medium to the channel and discharging it therefrom, and stirring mechanism operating in the receptacle.

5. In a mixing-machine, the combination with a receptacle having a bottom and sides comprising spaced walls and a convolute partition connecting the spaced walls and forming a correspondingly-shaped channel for the passage of a cooling medium, of rotatable stirring mechanism operating in the receptacle, and means for rotating the mechanism.

6. In a mixing-machine, the combination with a supporting-base, of a circular receptacle mounted thereon and comprising a bottom and sides, said bottom consisting of spaced walls and a convolute partition connecting the walls and forming a convolute passage-way, means for introducing a cooling medium into and discharging it from the passage-way, upright shafts journaled centrally within the receptacle, means mounted on the base for rotating the shafts, and rotatable stirring mechanism secured to the shafts and operating in different paths of movement in the receptacle.

In testimony that I claim the foregoing as my own I have hereto affixed my signature in the presence of two witnesses.

GUST PRATTS.

Witnesses:
 FRED W. BRUMAN,
 ERMA VAN SLYKE.